Patented Mar. 15, 1927.

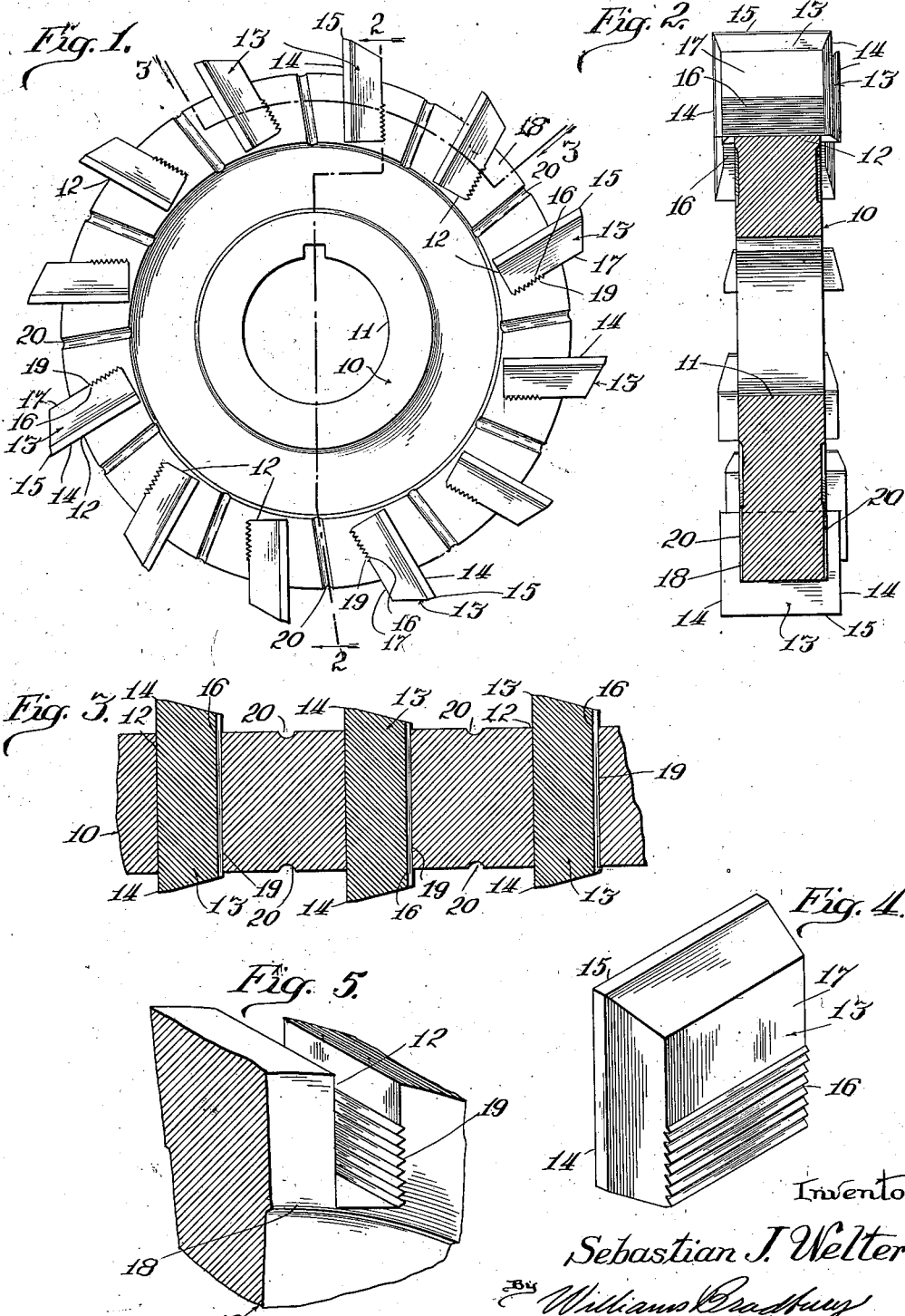

1,621,226

UNITED STATES PATENT OFFICE.

SEBASTIAN J. WELTER, OF CHICAGO, ILLINOIS, ASSIGNOR TO ARMSTRONG BROS. TOOL CO., OF CHICAGO, ILLINOIS, A CORPORATION OF ILLINOIS.

MILLING CUTTER.

Application filed September 19, 1923. Serial No. 663,554.

My invention relates to milling cutters and the method of making the same, being more particularly concerned with end or channel milling cutters of the inserted tooth type.

One object of my invention is to provide a milling cutter wherein the original cutting width may be maintained despite frequent resharpening.

Another object of my invention is the provision of improved means of securing the inserted teeth of a milling cutter.

A further feature of my invention is the way in which I secure the inserted teeth to prevent their radial withdrawal,—that is, withdrawal in the plane of the cutter—while still permitting transverse movement of the teeth under heavy pressure.

Other objects and advantages of my invention are to be found from the following description and from the appended claims. A specific embodiment of the cutter of my invention is shown in the accompanying drawings, the cutter being shown as it appears after the later described offsetting of the teeth has been performed.

Figure 1 of the drawings is an elevation thereof;

Figure 2 is a diametrical section taken on the line 2—2 of Figure 1;

Figure 3 is a fragmentary plan section taken on the line 3—3 of Figure 1;

Figure 4 is a detail perspective of one of the cutter teeth; and

Figure 5 is a fragmentary perspective view of one of the slots into which the tooth of Figure 4 is inserted, showing the walls of the slot as they are after the completed assembly of the cutter.

The side milling cutter here shown comprises a disc-shaped body or holder 10 provided with the usual center bore 11 and a keyway to provide for securement upon the arbor of a milling machine, and having a plurality of transverse peripheral slots 12 in which are secured cutting teeth 13. Each cutting tooth 13 comprises a pair of end cutting edges 14—14 and peripheral cutting edge 15. In the lower half of its back face each cutting tooth 15 is provided with a plurality of parallel teeth or serrations 16, which extend transversely of the tooth. It will be noted that the serrations 16 extend partly outwardly from and partly inwardly from the remaining surface 17 of the back face. In other words, the plane of the outer half 17 of the back face, if extended, would lie midway between the planes formed by the outer edges and by the inner edges of the serrations 16. The slots 12 in the body 10, before assembly of the cutter, are smooth sided and of width sufficient to make a driving fit with the back surface 17 of a tooth.

I prefer to form the teeth from a long strip of steel whereby the serrations 16 and the peripheral cutting edge 15 may be cut longitudinally of the strip. The strips are then severed to the desired width and the end edges 14—14 cut, after which the teeth are hardened. The body 10 is turned from a semi-soft steel and need not be hardened. Each face of the body is preferably provided with a shallow annular groove a distance in from the periphery, thus forming a slightly raised rim portion 18.

The teeth are pressed into their respective slots in the body in a transverse direction, so that the teeth or corrugations 16 cut mating serrations or teeth 19 in one side of the slots 12. It is to be observed, however, that because the bottoms of the serrations 16 are set inwardly from the face 17, the mating serrations 19 thus formed are not pointed teeth. After the teeth have been inserted and are in alignment so that their end cutting edges lie in the same planes, the assembled cutter is again placed in a powerful press having radial contact lugs which form radial grooves 20 in the slightly enlarged rims 18 of the body. This deforming of the portions of the body lying intermediate the teeth results in a slow flowing of the metal to make more perfect and forceful contact of the walls of the slots with their respective teeth. In addition to bringing all of the flat contact surfaces into a more perfect friction, the steel of the body is forced against the tooth serrations 16 to complete the formation of the mating serrations 19 in the form shown in Fig. 5.

By means of the mating serrations thus formed, it is impossible for the teeth to be withdrawn or displaced outwardly, but under sufficient force they may be displaced laterally, as this movement is in the direction of the serrations 16 and 19. Hence, when it is desired to resharpen the cutter teeth, the cutter is placed in a press, one member of the press being adapted to engage alternate teeth 15 of the cutter and to press them laterally a few thousandths of an inch. This offsets alternate teeth sufficiently so that after the teeth are resharpened the original cutting width is still maintained. Because of this offsetting, however, only one lateral edge 14 of a tooth remains an effective cutting edge, for its opposed lateral cutting edge has been set inwardly from the plane of other cutting edges.

While I have shown but this particular embodiment of my invention, it is to be understood that departures may be made therefrom without departing from the spirit or scope of my invention.

I claim:

1. The method of making a milling cutter and maintaining a uniform cutting width thereon which consists in pressing into transverse slots on an annular body, teeth having opposed lateral cutting edges and having serrations extending in the direction of said insertion thus cutting mating serrations in the walls of said slots adjacent said serrations, in deforming portions of said body between adjacent slots to press the walls thereof against the respective blades, and in subsequently transversely displacing certain of said blades in their respective slots offsetting them from the others of said blades to compensate for the lessening of the width of the cutter in resharpening.

2. The method of maintaining a predetermined cutting width for a milling cutter having peripheral teeth carried by a cutter body and held therein against transverse movement under heavy friction, which consists in permanently maintaining friction between the teeth and body sufficient to prevent their sliding under forces encountered in use, moving alternate teeth transversely of the body under heavier pressure to compensate for wear and grinding on the cutter ends of the teeth.

3. In the manufacture of milling cutters, the method of securing in slots of a metallic body, cutting teeth having transversely serrated sides juxtaposing walls of the slots, which consists in pressing the teeth into the slots to cause their serrations to cut mating serrations in the walls to but a part of the depth of the tooth serrations and then deforming the body between the slots to flow the metal of the body into the tooth serrations to complete the formation of mating serrations in the walls of the slots.

4. A milling cutter comprising a metallic head having slots therein, and a cutting tooth disposed in each slot and held against sliding movement by heavy frictional contact with the walls of the slot, a side of each tooth juxtaposing a wall of its associated slot having transversely extending serrations, the internal metallic structure of the head along said juxtaposing walls being substantially the same as that produced by having mating serrations in the said wall formed in part without, and in part by, flowing the adjacent metal of the head into the serrations of the tooth.

In witness whereof, I hereunto subscribe my name this 5th day of September, 1923.

SEBASTIAN J. WELTER.